United States Patent [19]
Takahashi et al.

[11] Patent Number: 5,035,059
[45] Date of Patent: Jul. 30, 1991

[54] HAND-HELD SCROLL SAW

[75] Inventors: Shoji Takahashi; Kouichi Miyamoto, both of Tokyo, Japan

[73] Assignee: Ryobi Ltd., Hiroshima, Japan

[21] Appl. No.: 557,838

[22] Filed: Jul. 26, 1990

[30] Foreign Application Priority Data

Aug. 4, 1989 [JP] Japan .................................. 1-203614

[51] Int. Cl.$^5$ .......................... B23D 49/06; B26B 7/00
[52] U.S. Cl. ........................................ 30/392; 30/273
[58] Field of Search ...................... 30/272.1, 273, 377, 30/392, 393; 83/698, 697

[56] References Cited

U.S. PATENT DOCUMENTS

| | | | |
|---|---|---|---|
| 2,738,812 | 3/1956 | Waddell | 30/392 |
| 2,762,122 | 9/1956 | Hermann | 30/272.1 |
| 3,097,430 | 7/1963 | Lewinski et al. | 30/273 |
| 3,412,767 | 11/1968 | Green, Jr. | 30/392 |
| 3,895,438 | 7/1975 | Burkepile et al. | 30/392 |
| 4,365,397 | 12/1982 | Felpel | 30/392 |
| 4,670,986 | 6/1987 | Chen | 30/392 |
| 4,949,464 | 8/1990 | Adomatis | 30/392 |

Primary Examiner—Douglas D. Watts
Assistant Examiner—Paul M. Heyrana, Sr.
Attorney, Agent, or Firm—Sughrue, Mion, Zinn, Macpeak & Seas

[57] ABSTRACT

A hand-held scroll saw having a blade includes a body having a handle provided at the upper portion of the body, a foot plate provided at the lower portion of the body so as to be slid on a workpiece which is to be cut by the saw, a piston provided over the front portion of the plate so as to be moved upwardly and downwardly, and a motor provided between the handle and the plate so as to move the piston up and down. A hung member is removably secured to the sawing blade at the upper end thereof, and a hanger is secured to the piston at the lower end thereof and engaged with the hung member. A U-shaped arm having an upper portion secured to the body and a lower portion located near the lower end of the blade so that the arm does not interfere with the workpiece. A pulled-down member is removably secured to the blade at the lower end thereof, and a pulling-down member is engaged with the pulled-down member. A spring is attached to the arm so as to pull the pulled-down member downwardly by the elastic restoring force of the spring as the piston is moved downwardly.

9 Claims, 3 Drawing Sheets

HAND-HELD SCROLL SAW

BACKGROUND OF THE INVENTION

The present invention relates to a hand-held scroll saw having a sawing blade which is moved upwardly and downwardly by a motor to cut a workpiece along a desired curve.

Since the compressive strength of the sawing blade of a scroll saw is very low, a first end of the blade is coupled to the lower end of a piston, which is moved upwardly and downwardly by a motor. The blade is supported at a second end thereof by a U-shaped arm, provided so as not to interfere with a workpiece, and the blade is pulled downwardly at the second end. Thus, the blade is reciprocated by upward and downward movement of the piston while always keeping the blade taut.

Conventional scroll saws have been provided previously which are of the heavy, fixed-installation type, as disclosed in Japanese Patent Examined Publication Nos. 3158/77 and 20720/78. A workpiece is cut along a desired curve by the conventional scroll saw, while the workpiece, positioned on a table, is turned relative to a sawing blade.

In a hand-held scroll saw, no table is provided, and a workpiece is not turned relative to a sawing blade. Instead, the workpiece is fixed in position. Hence, the hand-held scroll saw requires not only a U-shaped arm thereof to be compact, but also a blade support device for reciprocating the blade while keeping the blade taut. In the hand-held scroll saw, construction of the blade support device is paramount over making the U-shaped arm compact. Thus, the blade support device of the hand-held scroll saw cannot be constituted similarly to the scroll saws of the heavy, fixed-installation type, nor manufactured by making the blade support device, with components equivalent to the scroll saws of the heavy, fixed-installation type, compact. Additionally, since the range of the workpiece cut off by the hand-held scroll saw would be made narrow if the U-shaped arm thereof is made compact, the range must be prevented from being made narrow by making the U-shaped arm large and cumbersome. Thus, in conventional hand-held saws, a compact hand-held scroll saw with a suitable range cannot be achieved. This presents a problem.

SUMMARY OF THE INVENTION

It is an object of the present invention to provide a hand-held scroll saw of simple construction and high cutting performance, in which a sawing blade is moved upwardly and downwardly by a motor to cut a workpiece along a desired curve and in which the blade is kept taut continuously to prevent the blade from buckling, and thereby breaking.

It is another object of the present invention to provide a hand-held scroll saw in which the width direction (i e., orientation) of the sawing blade can be changed easily from a forward direction to a sideward direction to cut a workpiece along a slender, sideward contour.

It is yet another object of the present invention to provide a hand-held scroll saw having a sawing blade which is easily replaceable.

The hand-held scroll saw of the invention comprises a body including a handle provided at the upper portion of the body so as to be grasped by an operator's hand to hold the saw, a foot plate provided at the lower portion of the body so as to be slid on the workpiece, a piston provided over the front portion of the foot plate so as to be moved upwardly and downwardly, and a motor provided between the handle and the foot plate so as to move the piston upwardly and downwardly; a hung member removably secured to the blade at the upper end thereof; a hanger secured to the piston at the lower end thereof and engaged with the hung member; a U-shaped arm having an upper portion secured to the body and a lower portion which is located near the lower end of the blade, so that the U-shaped arm does not interfere with the workpiece; a pulled-down member removably secured to the blade at the lower end thereof; a pulling-down member engaged with the pulled-down member; and a spring attached to the U-shaped arm so as to lower the pulled-down member by the elastic restoring force of the spring.

When the workpiece is to be cut along a desired contour by the hand-held scroll saw, the handle is grasped by an operator's hand to hold the saw body, and the front portion of the foot plate is positioned on the edge of the workpiece, which has been clamped horizontally. The motor is driven to reciprocate the piston, and then the saw body is slowly moved along the desired contour to cut the workpiece by the cutting force of the blade. The cutting of the workpiece is performed when the blade is pulled up by the ascent of the piston to which the blade is secured.

When the piston is upwardly and downwardly moved, the blade is pulled downwardly by the downward urging force of the spring on the pulling-down member to which a lower portion of the blade is secured. Thus, the blade is upwardly and downwardly moved while always keeping the blade taut. As a result, the workpiece is cut precisely and the blade is prevented from buckling and thereby breaking.

BRIEF DESCRIPTION OF THE DRAWINGS

The above and other objects, features, and advantages of the invention will become more apparent from the following detailed description when read in conjunction with the accompanying in which:

FIG. 5 is a sectional view of the saw along a line VI shown in FIG. 1.

DETAILED DESCRIPTION OF THE PREFERRED EMBODIMENT

An embodiment of the present invention is described in detail hereinafter with reference to the drawings attached hereto.

Figure 1:
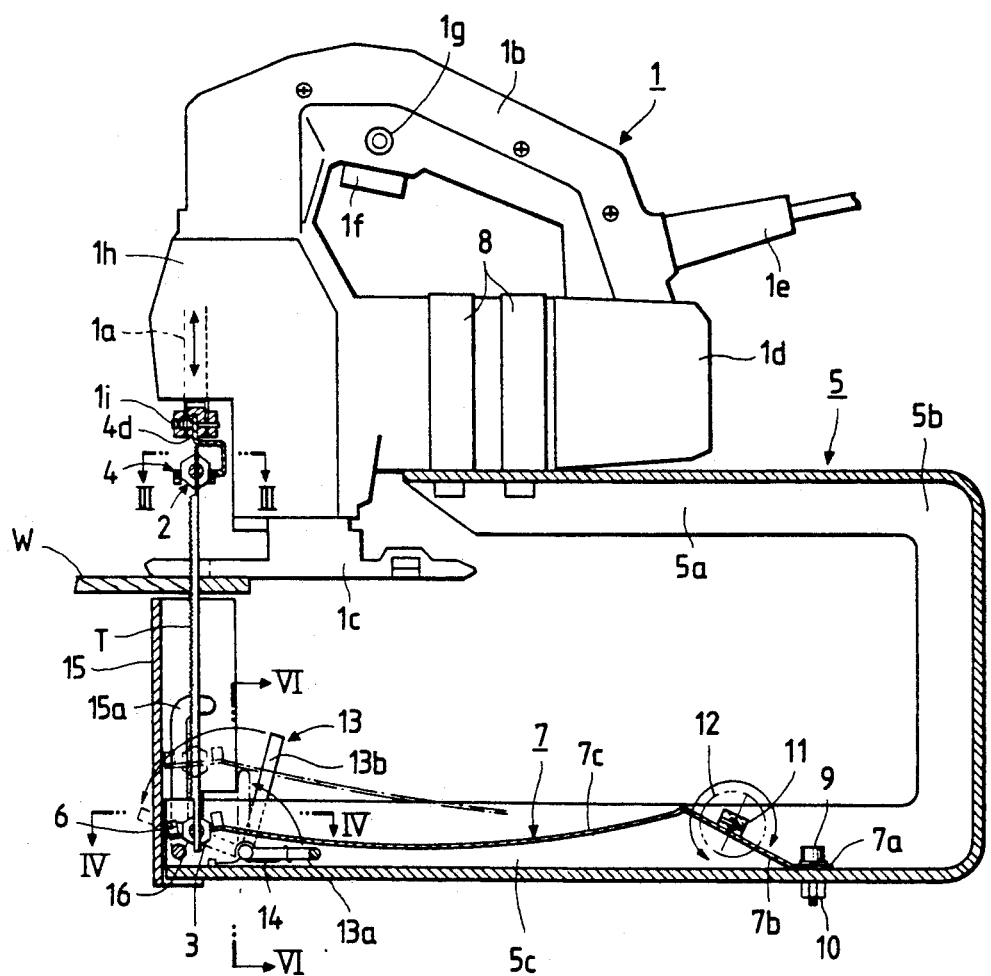
FIG. 1 is a partially longitudinal sectional view of a hand-held scroll to an embodiment of the present invention.
Figure 2:
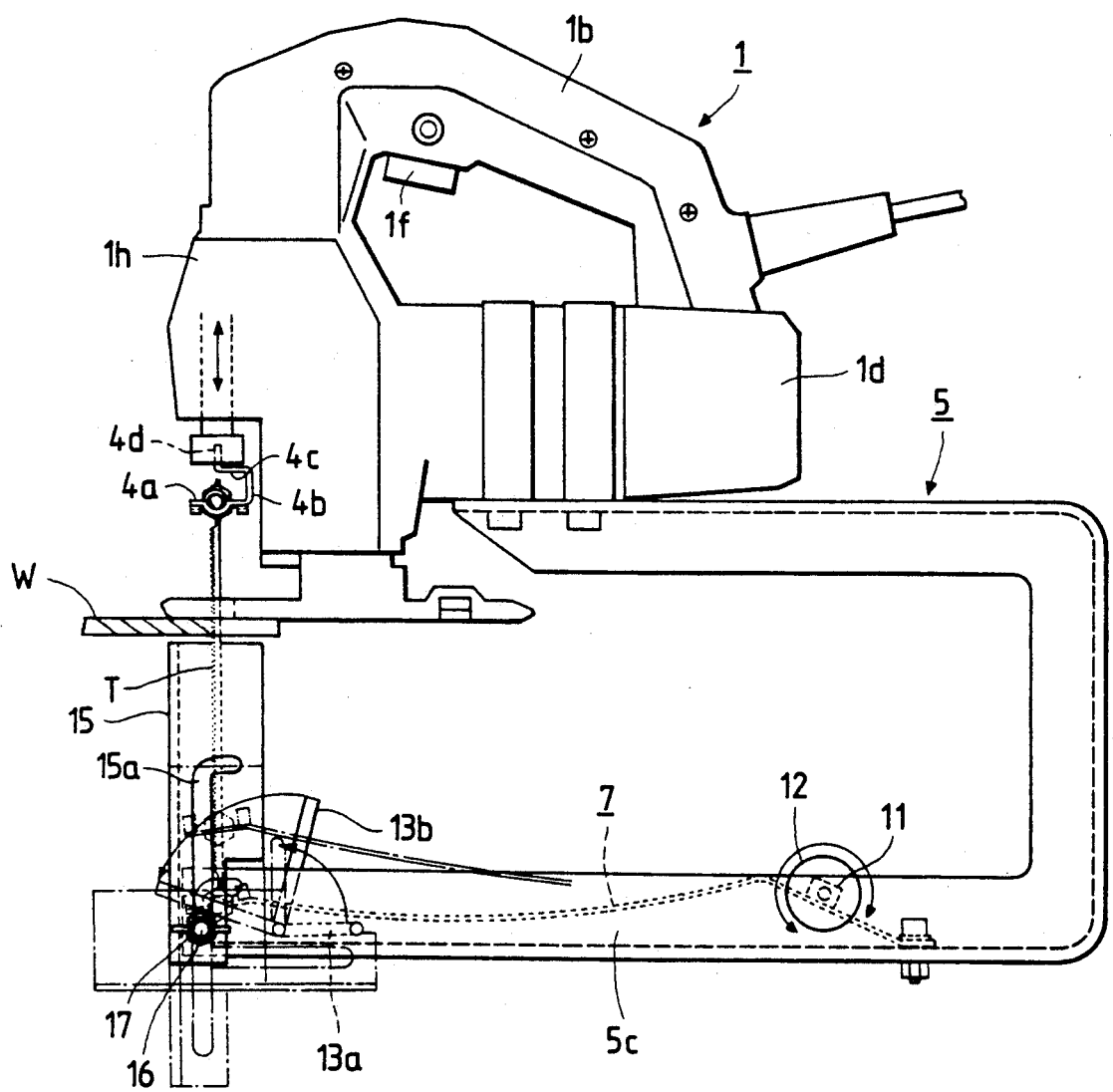
FIG. 2 view of the saw shown in FIG. 1.

As shown in FIGS. 1 and 2. a hand-held scroll saw, according to the invention, includes a body 1 and a hung member 2. The hung member 2 is removably secured to a sawing blade T at the upper end thereof. A pulled-down member 3 is removably secured to the blade T at the lowest end thereof. A hanger 4 is secured to the lower end of the piston 1a of the body 1 so that the hung member 2 can be engaged with the upper surface of the hanger 4. A U-shaped arm 5 is secured to the body 1. A pulling-down member 6 is engaged with the upper surface of the pulled-down member 3. A plate spring 7, attached to the U-shaped arm 5, pulls down the pulling-down member 6 by the elastic restoring force of the spring.

The body 1 includes a handle 1b, located at the upper portion of the body 1, which is grasped by an operator's hand so that the scroll saw can be held. A foot plate 1c, located at the lower portion of the body 1, slides on a workpiece W when the workpiece is being cut by the saw. The piston 1a is provided over the front portion of the foot plate 1c so as to be moved upwardly and downwardly by a stroke of 25 mm. The body 1 also includes a motor 1d, provided between the handle 1b and the foot plate 1c, for moving the piston 1a upwardly and downwardly when a motor switch button 1f is pushed to supply electricity, via a power cable 1e, to the motor.

If a locking button 1g is pushed as the motor switch button 1f is depressed, the motor switch button 1f is locked in a depressed position to maintain the electricity supply to the motor 1d. The piston 1a is the output member of a movement conversion mechanism 1h which converts the rotation of the motor 1d into the straight reciprocation of the piston. After the upper end of the hanger 4 is inserted into the exposed lower end of the piston 1a, a screw 1i is driven horizontally backward into the lower portion of the piston 1a so that the hanger 4 is secured thereto.

Figure 3:
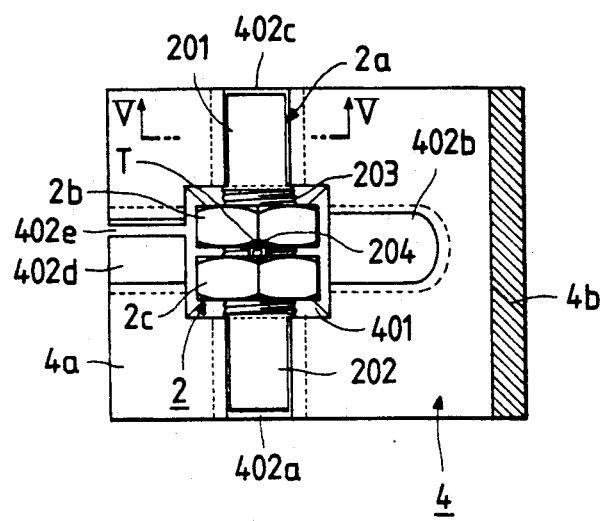
FIG. 3 sectional view of the saw along a line III shown in FIG. 1.

As shown in FIG. 3, the hung member 2 includes a pivotal shaft 2a and a pair of nuts 2b and 2c. The shaft 2a has lateral portions 201 and 202, each of which is wedge-shaped at the lower part thereof, and a central threaded portion 203 having a small hole 204 at the center thereof. The upper portion of the sawing blade T is inserted through the small hole 204 and secured by the nuts 2b and 2c engaged on the threaded portion 203.

The hanger 4 is hook-shaped, and made of a thick steel plate formed by a press-working operation. Hanger 4 includes a lower portion 4a, with the upper surface thereof engaged with the hung member 2, a vertical portion 4b extending up from the rear end of the lower portion 4a, an upper horizontal portion 4c extending forward from the vertical portion 4b, and a second vertical portion 4d extending up from the upper horizontal portion 4c, and inserted into the piston 1a and secured thereto by the tightened screw 1i, as shown in FIG. 2.

Figure 5:
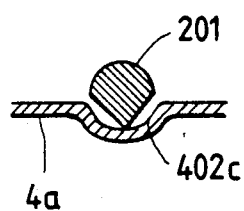
FIG. 5 is a sectional view of the saw along a line V shown in FIG. 3.

The lower portion 4a of the hanger 4 has a square opening 401 in the center thereof, and recesses 402a, 402b, 402c, and 402d formed in the upper side of portion 4a by a press-working operation so that the center lines of the recesses are coincident with the centers of the four sides of the opening 401, as shown in FIG. 3. The threaded portion 203 and nuts 2b and 2c of the hung member 2 are housed in the opening 401 of the lower portion 4a of the hanger 4. As partially shown in FIG. 5, the lateral portions 201 and 202 of the pivotal shaft 2a of the hang member 2 are fitted in the recesses 402a and 402c of the hanger 4. The cutting edge of the blade T is located at the front thereof.

The pulled-down member 3 has a similar construction to that of the hung member 2, and includes a pivotal shaft 3a and a pair of nuts 3b and 3c engaged in the intermediate threaded portion 303 of the shaft extending parallel to nut 2b of the hung member. The lower portion of the blade T is inserted through the small hole 304 of the threaded portion 303 of the shaft 3b and secured between the nuts 3b and 3c.

The U-shaped arm 5 is made of a channel iron by a press-working working operation so that the ribs of the channel iron are located on the inside of the arm 5. As shown in FIGS. 1 and 2, the upper horizontal portion 5a of the arm 5 is secured at the front end thereof to the casing of the motor 1d of the body 1 by a band device 8 for clamping the motor onto the arm 5. The vertical portion 5b of the arm 5 is located at a prescribed distance from the rear end of the foot plate 1c of the body 1, so that the vertical portion 5b does not interfere with the workpiece W. The front end of the lower horizontal portion 5c of the arm 5 is located under the piston 1a so that the webs of the portion 5c extend at both sides of the lower end of the blade T.

Figure 4:
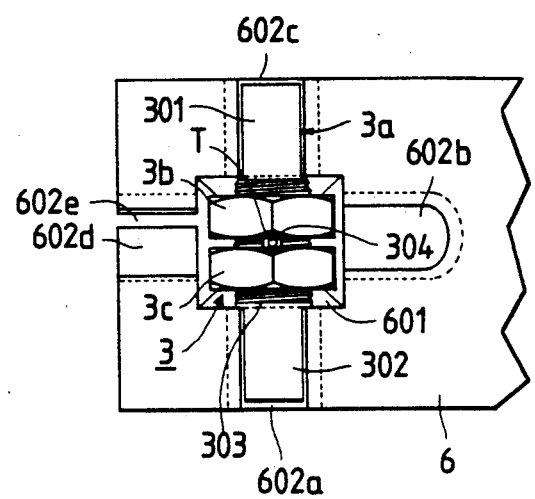
FIG. 4 is a sectional view of the saw along a line IV shown in FIG. 1.

The pulling-down member 6 is integrally provided on the front portion of the plate spring 7 which is relatively long, and has a similar constitution to the lower portion 4a of the hanger 4, as shown in FIG. 4. The pulling-down member 6 has a square opening 601 in the center of the member, and recesses 602a, 602b, 602c, and 602d made in the lower side of the member 6 by a press-working operation so that the center lines of the recesses are coincident with the centers of the four sides of the opening 601. The threaded portion 303 of the pivotal shaft 3a of the pulled-down member 3 and the nuts 3b and 3c thereof are housed in the opening 601 of the pulling-down member 6. The lateral portions 301 and 302 of the pivotal shaft 3a, which are wedge-shaped at the upper parts thereof, are fitted in the recesses 602a and 602c of the pulling-down member 6 so that the wedge-shaped upper parts of the portions 301, 302 contact the lower surface of the pulling-down member 6. The elastic force of the plate spring 7 urges the member 6 in a direction so as to move the pulled-down member 3 down.

The plate spring 7 is housed in the channel of the lower horizontal portion 5c of the U-shaped arm 4, and includes a rear portion 7a secured to the lower horizontal portion 5c of the arm 5 by a bolt 9 and a nut 10, a short oblique portion 7b sloping up from the front end of the rear portion 7a, and a long oblique portion 7c sloping down from the front end of the short oblique portion 7b. The pulling-down member 6 extends forwardly from the curved, long oblique portion 7c. The pulling-down member 6 is engaged with the upper side of the pulled-down member 3 so that the pulled-down member is urged downwardly by the spring 7.

The plate spring 7 is urged downwardly by an angular cam 11 located on the upper side of the short oblique portion 7b of the spring, so that the urging force of the long oblique portion 7c acting on the pulled-down member 3 is increased. The angular cam 11 has an oblong cross-section and is eccentrically supported so that the distances from the center of cam rotation to the four sides thereof differ from one another. A knob 12 can be turned to put a selected one of the four sides of the cam 11 into contact with the long oblique portion 7c of the plate spring 7 to set the urging force thereof for the pulled-down member 3 to a suitable one of four levels.

When the distance between the hinge member 2 and the pulled-down member 3, which are both secured to the sawing blade T, is large, the knob 12 is turned to increase the urging force of the long oblique portion 7c of the plate spring 7 to set the blade tension to a level to cut the workpiece W optimally. When the distance is small, the knob 12 is turned to decrease the urging force to set the blade tension to a level to cut the workpiece W optimally.

Figure 6:
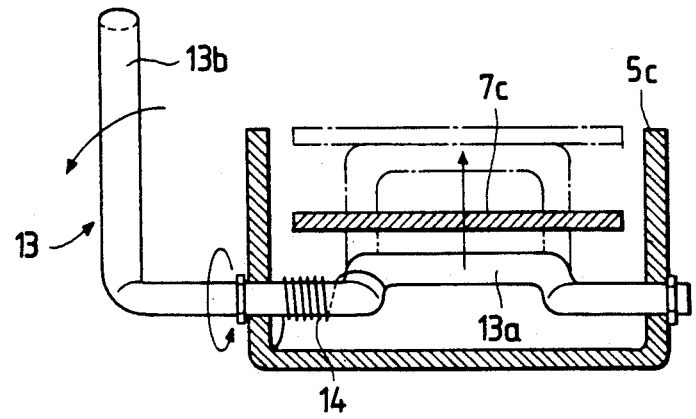

As shown in FIG. 6, a crank-shaped spring lifting lever 13 is provided as a pulled-down member lifting device so as to move the plate spring 7 up, as shows by the one-dot chain lines in FIG. 1 and 2. The lever 13 has a U-shaped portion 13a, which contacts the spring 7 to move it up, and a handle 13b. The U-shaped portion 13a extends through the small holes of both the webs of the lower horizontal portion 5c of the U-shaped arm 5 and is supported at both the ends of the U-shaped portion 13a by the webs.

When the handle 13b, which is upwardly positioned, is turned down forwardly, the U-shaped portion 13a is upwardly positioned instead of the handle 13b so as to move the plate spring 7 up, as shown by the one-dot chain line in FIGS. 1 and 2. A return spring 14 is fitted on the U-shaped portion 13a to turn the U-shaped portion 13a downwardly. However, when the portion 13a is upwardly positioned, the plate spring 7 acts as a stopper to prevent the portion 13a from being turned downwardly by the return spring 14. Thus, even if the handle 13b is released from an operator's hand which is moving the plate spring 7 up by the lever 13, the plate spring is kept moved up.

The lower portion 4a of the hanger 4 has a slit 402e extending along the front recess 402d thereof and communicating with the opening 401 thereof. The pulling-down member 6 has a slit 602e extending along the front recess 602d thereof and communicating with the opening 601 thereof. When the plate spring 7 is moved up so that the distance between the hanger 4 and the pulling-down member 6 decreases, the sawing blade T, to which the hung member 2 and the pulled-down member 3 are already secured, is inserted into the openings 401 and 601 backwardly through the slits 402e and 602e.

Thereafter, the sawing blade T is horizontally turned by 90 degrees so that the portions 201 and 202 of the pivotal shaft 2a of the hung member 2 are fitted in the recesses 402b and 402d of the upper side of the lower portion 4a of the hanger 4, and the portion 301 and 302 of the pivotal shaft 3a of the pulled-down member 3 are fitted in the recesses 602b and 602d of the lower side of the lower portion 6a of the pulling-down member 6. Thus, the hand-held scroll saw can move not only forwardly to cut the workpiece W along a curve, but also can move sidewardly to cut the workpiece along a curve since the orientation (i.e., width direction) of the blade T can be changed by 90 degrees. Thus, the workpiece W can be cut to a slender product by the hand-held scroll saw, even though the U-shaped arm 5 is compact enough to enable the saw to be held easily by an operator.

A safety cover 15 is attached to the lower horizontal portion 5c of the U-shaped arm 5 and is located in front of the blade T. The cover 15 is made of channel iron, and has L-shaped slots 15a in both ribs thereof. A bolt 16 is inserted through the slots 15a and the small holes of the webs of the lower horizontal portion 5c of the U-shaped arm 5. Thereafter, a wing nut 17 is tightened onto the bolt. Thus, the safety cover 15 is secured in an upper position, as shown by a full line in FIG. 2, when the workpiece W has a small thickness. As shown by a one-dot chain line in FIG. 2, the safety cover is secured in a lower position when the workpiece has a large thickness. When the blade T is to be replaced or the direction of the width thereof (i.e., orientation of the blade) is to be changed by 90 degrees, the wing nut 17 is loosened, thus lowering the safety cover 15, and then the lowered cover is turned forwardly.

When the sawing blade T is to be attached to the body 1 and the arm 5, the wing nut 17 is loosened, the safety cover 15 is lowered forwardly, and the spring lifting lever 13 is lowered forwardly to move the plate spring 7 up to a position shown by the one-dot chain lines in FIGS. 1 and 2. The blade, which has the hung member 2 and the pulled-down member 3 already secured at both ends of the blade, is put into the openings 401 and 601 of the hanger 4 and the pulling-down member 6 through the slits 402e and 602e thereof to engage the hung member with the upper surface of the hanger 4. The spring lifting lever is slowly set up into a position slightly tilted backward from a vertical position, to lower the plate spring to pull down the pulled-down member 3 by the pulling-down member 6 to tighten the blade. Thus, the angular cam 11 is turned by the knob 12 to adjust the urging force of the plate spring 7 to set the blade T at an appropriate tension level. Thereafter, the safety cover 15 is upwardly positioned so as not to interfere with the workpiece W, and the wing nut 17 is tightened securely. Thus, the blade T is attached to the body and arm 5.

When the workpiece W is to be cut by the hand-held scroll saw, the saw is held by an operator's hand, the foot plate 1c is put on the edge of the workpiece which has been secured appropriately, and the motor switch button 1f is depressed to drive the motor 1d to reciprocate the piston 1a to move the blade T upwardly and downwardly. Then, the body 1 is slowly moved along a desired contour.

When the piston 1a is moved upwardly, the plate spring 7 is raised so that the pulling-down member 6 is moved up from a position lower than the joint of the short and long oblique portions 7b and 7c, respectively, of the plate spring, to a position higher than that of the joint, because of the arc-shaped elastic deformation of the long oblique portion. Thus, the blade T is not vertically lifted per se, but lifted while it is slightly moved forward, so that the blade exerts cutting pressure on the workpiece W. Hence, the workpiece W is cut efficiently by the blade T.

When the piston 1a is moved downwardly, the blade T is pulled downwardly by the urging force of the plate spring 7 attached to the lower portion of the U-shaped arm 5, so that the blade is not vertically moved down per se, but moved downwardly while it is being slightly moved backward. Thus, the blade T does not exert cutting pressure on the workpiece W. At that time, the resistance to the blade T being pulled down is so low that the blade is pulled downwardly by the elastic restoring force of the plate spring 7 without cutting the workpiece W. Thus, the blade T is upwardly and downwardly reciprocated by a co-operation of the upward and downward movement of the piston 1a and the downward urging force of the plate spring 7 while always keeping the blade taut, as the body 1 of the hand-held scroll saw is moved along the desired contour drawn on the workpiece. As a result, the workpiece is cut precisely and stably along the contour by the blade.

When the workpiece is to be but along a desired contour drawn thereon inside the edges thereof, a small hole is drilled in the workpiece, the blade T is put through the small hole, and the hung member 2 and the pulled-down member 3 are then secured to the blade.

Thereafter, the blade is attached to the body 1 of the scroll saw as described above, and the cutting operation is started.

During the cutting of the workpiece W by the blade T, a reactionary force acts at the workpiece cutting point in a direction reverse to that of the advance of the blade, so that the blade is very slightly bent to an obtuse angle at the cutting point. Since the blade T is moved upwardly and downwardly, the distance between the cutting point and each of the upper and lower ends of the blade always changes so that the slight obtuse-angled bending of the blade continually changes.

Thus, if the blade T was secured at the upper and lower ends thereof, some fluctuating moment would occur due to the reactionary force so that the blade would easily break at the cutting point, even if the reactionary force was increased slightly. However, in the embodiment of the invention, the sharp edges of the wedge-shaped parts of the portions 201, 202, 301, and 302 of the upper and lower pivotal shafts 2a and 3a are placed on the hanger 4 and the pulling-down member 6 in the recesses 402a, 402c, 602a, and 602c thereof so that the blade T is supported at the upper and lower ends thereof to perform as proper pin fulcrums so as not to let any moment occur due to the reactionary force. Thus, the blade T is unlikely to break even if cutting the workpiece W while exerting a strong cutting force thereon.

The present invention is not confined to the above-described embodiment, but may be embodied or practiced in other various ways without departing from the spirit or essential character thereof. For example, a helical spring may be provided instead of the plate spring 7. If the helical spring is provided instead of the plate spring 7, the pulling-down member 6, which is integrally provided on the plate spring at the front end thereof in the above described embodiment, is separately provided. The motor 1d may be an air motor. The hung member 2 and the pulled-down member 3 may be various conventional pinching devices, so long as the hung member is engaged with the upper surface of the hanger 4 and hung therefrom and the pulled-down member is engaged with the lower surface of the pulling down member 6 and pulled down. The hanger 4 and the pulling-down member 6 also may be constituted so as not to have the slits 402e and 602e. If the hanger 4 and the pulling-down member 6 do not have the slits 402e and 602e, the plate spring 7 is shifted upwardly to decrease the distance between the hanger and the pulling-down member, and the hung member 2 is secured to the blade T at the upper end thereof. Thereafter, the lower end thereof is inserted through the openings 401 and 601 of the hanger and the pulling-down member, and the pulled-down member 3 is secured to the blade at the lower end thereof, thus attaching the blade to the body 1.

While certain preferred embodiments have been shown and described, many changes and modifications within the spirit of the invention will be apparent to those of working skill in this technical field. Thus, the scope of the invention should be considered as limited only by the appended claims.

What is claimed is:

1. A hand-held scroll saw comprising:
   a body including a handle provided at an upper portion of said body, a foot plate provided at a lower portion of said body so as to be slid on a workpiece which is to be cut by said saw, a piston provided over the front portion of said plate so as to be moved upwardly and downwardly, and a motor provided between said handle and said plate so as to move said piston upwardly and downwardly;
   a sawing blade;
   a hung member removably secured to said sawing blade at an upper end thereof;
   a hanger secured to said piston at a lower end thereof and engaging said hung member;
   a U-shaped arm having an upper portion secured to said body and a lower portion located near a lower end of said blade so that said arm does not interfere with said workpiece;
   a pulled-down member removably secured to said blade at said lower end thereof;
   a pulling-down member engaging said pulled-down member; and
   a spring attached to said arm so as to pull downwardly said pulled-down member by an elastic restoring force of said spring, a tension of said spring being adjustable to attendantly optimize a cutting tension of said sawing blade.

2. A hand-held scroll saw according to claim 1, wherein a surface of said hanger, which is engages with said hung member, and a surface of said pulling-down member, which engages with said pulled-down member, have recesses in which said hung member and said pulled-down member are stably fitted so that each of said hung member and said pulled-down member can be optionally oriented in one of a first and second directions, said first and second directions differing from each other by an angle of 90 degrees.

3. A hand-held scroll saw comprising:
   a body including a handle provided at an upper portion of said body, a foot plate provided at a lower portion of said body so as to be slid on a workpiece which is to be cut by said saw, a piston provided over the front portion of said plate so as to be moved upwardly and downwardly, and a motor provided between said handle and said plate so as to move said piston upwardly and downwardly;
   a sawing blade;
   a hung member removably secured to said sawing blade at an upper end thereof;
   a hanger secured to said piston at a lower end thereof and engaging said hung member;
   a U-shaped arm having an upper portion secured to said body and a lower portion located near a lower end of said blade so that said arm does not interfere with said workpiece;
   a pulled-down member removably secured to said blade at said lower end thereof;
   a pulling-down member engaging said pulled-down member;
   a spring attached to said arm so as to pull downwardly said pulled-down member by an elastic restoring force of said spring; and
   a lifting means for lifting said pulling-down member against the urging force of said spring at a time of replacement of said sawing blade, said lifting means being provided on said U-shaped arm.

4. A hand-held scroll saw according to claim 3, wherein said blade is inserted through a slit of said pulling-down member lifted by said lifting means, so that said pulled-down member is located under said pulling-down member, and said blade is inserted through a slit of said hanger so that said hung member is located over said hanger.

5. A hand-held scroll saw according to claim 3, wherein said lifting means contacts said spring to move said spring in an upward direction.

6. A hand-held scroll saw comprising:
a body including a handle provided at an upper portion of said body, a foot plate provided at a lower portion of said body so as to be slid on a workpiece which is to be cut by said saw, a piston provided over the front portion of said plate so as to be moved upwardly and downwardly, and a motor provided between said handle and said plate so as to move said piston upwardly and downwardly;
a sawing blade;
a hung member removably secured to said sawing blade at an upper end thereof;
a hanger secured to said piston at a lower end thereof and engaging said hung member;
a U-shaped arm having an upper portion secured to said body and a lower portion located near a lower end of said blade so that said arm does not interfere with said workpiece;
a pulled-down member removably secured to said blade at said lower end thereof;
a pulling-down member engaging said pulled-down member; and
a spring attached to said arm so as to pull downwardly said pulled-down member by an elastic restoring force of said spring; wherein said spring comprises a plate spring.

7. A hand-held scroll saw according to claim 6, wherein said pulling-down member is integrally provided with said plate spring.

8. A hand-held scroll saw comprising:
a body including a handle provided at an upper portion of said body, a foot plate provided at a lower portion of said body so as to be slid on a workpiece which is to be cut by said saw, a piston provided over the front portion of said plate so as to be moved upwardly and downwardly, and a motor provided between said handle and said plate so as to move said piston upwardly and downwardly;
a sawing blade;
a hung member removably secured to said sawing blade at an upper end thereof;
a hanger secured to said piston at a lower end thereof and engaging said hung member;
a U-shaped arm having an upper portion secured to said body and a lower portion located near a lower end of said blade so that said arm does not interfere with said workpiece;
a pulled-down member removably secured to said blade at said lower end thereof;
a pulling-down member engaging said pulled-down member; and
a spring attached to said arm so as to pull downwardly said pulled-down member by an elastic restoring force of said spring; wherein said spring comprises a helical spring.

9. A hand-held scroll saw comprising:
a body including a handle provided at an upper portion of said body, a foot plate provided at a lower portion of said body so as to be slid on a workpiece which is to be cut by said saw, a piston provided over the front portion of said plate so as to be moved upwardly and downwardly, and a motor provided between said handle and said plate so as to move said piston upwardly and downwardly;
a sawing blade;
a hung member removably secured to said sawing blade at an upper end thereof;
a hanger secured to said piston at a lower end thereof and engaging said hung member;
a U-shaped arm having an upper portion secured to said body and a lower portion located near a lower end of said blade so that said arm does not interfere with said workpiece;
a pulled-down member removably secured to said blade at said lower end thereof;
a pulling-down member engaging said pulled-down member;
a spring attached to said arm so as to pull downwardly said pulled-down member by an elastic restoring force of said spring; and
a cam contacting said spring, wherein said elastic restoring force of said spring is adjusted optionally by said cam.

* * * * *